(12) United States Patent
Sonobe et al.

(10) Patent No.: US 6,303,215 B1
(45) Date of Patent: Oct. 16, 2001

(54) TRANSFER BELT FOR ELECTROPHOTOGRAPHIC APPARATUS AND METHOD OF MANUFACTURING THE SAME

(75) Inventors: Saburo Sonobe, Toride; Akio Onuki, Kanagawa-ken, both of (JP)

(73) Assignee: Kinyosha Co., Ltd., Tokyo (JP)

( * ) Notice: Subject to any disclaimer, the term of this patent is extended or adjusted under 35 U.S.C. 154(b) by 0 days.

(21) Appl. No.: 09/190,641

(22) Filed: Nov. 12, 1998

(30) Foreign Application Priority Data

Nov. 18, 1997 (JP) .................................................. 9-317075

(51) Int. Cl.$^7$ .................................................. B32B 25/02
(52) U.S. Cl. .................. 428/295.4; 428/222; 428/297.1; 428/313.5; 474/237; 474/239; 474/268; 474/271

(58) Field of Search ............................ 428/222; 474/237, 474/239, 268, 271

(56) References Cited

U.S. PATENT DOCUMENTS

| 2,318,441 | * | 5/1943 | Walton et al. | 74/232 |
| 2,597,284 | * | 5/1952 | Brown et al. | 74/232 |
| 5,830,248 | * | 11/1998 | Christianson et al. | 51/295 |

* cited by examiner

Primary Examiner—Elizabeth M. Cole
Assistant Examiner—Norca L. Torres
(74) Attorney, Agent, or Firm—Volpe and Koenig, P.C.

(57) ABSTRACT

Disclosed is a transfer belt for an electro-photographic apparatus, comprising a seamless reinforcing layer made of a continuous string, and a semi-conductive rubber layer formed on the reinforcing layer.

23 Claims, 2 Drawing Sheets

TRANSFER BELT FOR ELECTROPHOTOGRAPHIC APPARATUS AND METHOD OF MANUFACTURING THE SAME

BACKGROUND OF THE INVENTION

The present invention relates to a transfer belt for an electrophotographic apparatus and a method of manufacturing the same, particularly, to a transfer belt used in place of a transfer roll or a transfer drum in an electrophotographic apparatus, particularly, a plain paper copying machine (xerography) or a color printer, and to a method of manufacturing the same.

In a transfer system of toner from a photo-conductive drum included in a copying machine, a color printer, a facsimile, etc. using an electrophotographic system to a paper sheet, it was customary to use a transfer roll made of a sponge rubber having a semi-conductivity. In preparing the conventional transfer roll, an electrically conductive powder is added to an ethylene-propylene rubber to impart a semi-conductivity having an electrical resistivity of $10^8$ to $10^9$ $\Omega \cdot cm$ to the rubber, followed by forming the rubber into a sponge roll having an Asker C type hardness of about 30° (Japan Hardcopy '91, p27).

In a transfer system using the transfer roll, the roll has such a small diameter as about 15 mm. Therefore, it is impossible to secure a wide nip width with the photoconductive drum, resulting in failure to achieve a high copying speed. In a color copying machine or a color printer, the copying speed is only about 10 sheets/minute.

It is conceivable to widen the nip width by increasing the diameter of the transfer roll. In this case, it is certainly possible to increase the copying speed. However, the apparatus itself is rendered bulky, making it impractical to increase the diameter of the transfer roll. Under the circumstances, it is proposed to widen the nip width by using a transfer belt in place of the transfer roll ("Electrography" by The Society of Electrophotography of Japan 30(3), 54(1991)).

FIG. 8 shows the concept of a copying machine. As shown in the drawing, a transfer roll 2, a developing roll 3 and a charging roll 4 for charging a photo-sensitive drum 1 are arranged in the vicinity of the photoconductive drum 1. Also, a fuser roller 5 is arranged downstream of the photoconductive drum 1. In the copying machine of the construction shown in FIG. 8, a toner image is formed on the photoconductive drum 1 by the developing roll 3 and, then, transferred onto a paper sheet 6 by the transfer roll 2. Further, the toner image transferred onto the paper sheet 6 is heated by the fuser roller 5 so as to be melted and fixed.

FIG. 9 shows the concept exemplifying a transfer belt system. The members of the system common with FIGS. 8 and 9 are denoted by the same reference numerals so as to omit the explanation thereof in the following description. As shown in FIG. 9, a corona transfer device 7 and a charging device 8 are arranged close to and slightly apart from the photoconductive drum 1. A transfer belt 10, which is driven by driving rolls 9a, 9b and supported by a supporting roll 9c, is stretched so as to be transferred between the photoconductive drum 1 and the corona transfer device 7. As apparent from FIG. 9, the nip width between the photoconductive drum 1 and the transfer belt 10 can be widened.

The transfer roll and the transfer belt are required to exhibit a stable electrical resistivity, i.e., a semi-conductivity of $10^7$ to $10^{13}$ $\Omega \cdot cm$. Particularly, these roll and belt are required to be low in fluctuation of the electrical resistivity under various environments. To be more specific, the transfer roll and the transfer belt are required to exhibit less than an exponent of fluctuation in the resistivity under various conditions such as a high temperature-high relative humidity RH of 30° C. and 80%, a low temperature-low relative humidity RH of 23° C. and 5%, or an ordinary temperature-ordinary relative humidity RH of 23° C. and 55%. The reasons for the requirement of the stable resistivity are that, if the resistivity is unduly low, the voltage is lowered, resulting in failure for the roll or belt to be charged, and that, if the resistivity is unduly high, current is unlikely to flow through the roll or belt, leading to a low charging potential.

What should also be noted is that ozone is generated within the copying machine or the printer. Naturally, it is important for the transfer roll or the transfer belt to exhibit a high resistance to ozone and a reasonable heat resistance and not to contaminate the photoconductive drum. In addition to these requirements, the transfer belt is required not to run zigzag during operation of the copying machine, to be low in elongation relative to a predetermined tension, to exhibit an excellent dimensional stability, and not to bear a permanent set over a long period of time. In general, the transfer belt is said to receive a tension of 2 to 3 Kgf/cm and to exhibit an elongation of about 5%. In other words, the belt is elongated by about 5% during operation of the copying machine. Further, the belt surface is required to readily release the toner and to have a small friction coefficient.

A transfer belt prepared by extruding a polyurethane rubber in a cylindrical form, followed by vulcanizing the extrudate and subsequently polishing the surface of the extrudate and, then, coating the surface of the extrudate with a fluorine resin is disclosed in "Electrography" by The society of Electrophotography of Japan 33(1), 43(1994)".

However, a reinforcing layer is not incorporated in the polyurethane rubber transfer belt noted above, with the result that relaxation of stress takes place if tensity of the transfer belt is continued. In this case, a permanent set is generated so as to give rise to loosening of the belt. It follows that the transfer belt fails to be rotated as desired so as to distort the toner image. In other words, the transfer belt fails to perform its function.

An additional defect inherent in the polyurethane rubber transfer belt is that the rubber tends to be markedly affected by the environment, particularly, by the humidity. In some cases, depolymerization of the polyurethane rubber is brought about by the humidity, with the result that the hardness of the transfer belt is markedly lowered. In addition, the resistivity of the transfer belt under an environment of a low humidity is more than 10 times as high as that under an environment of a high humidity, which is a decisive defect. Needless to say, the resistivity of the polyurethane rubber is markedly lowered with increase in humidity of the environment.

Further, the polyurethane rubber is poor in resistance to ozone and heat generated within the copying machine or the printer.

A method of manufacturing an electrically conductive rubber belt is also disclosed in Japanese Patent Disclosure (Kokai) No. 4-99446. It is disclosed that a roll coater is arranged on a rotating shaft, and a tank housing a solid rubber paste mixed with a conductivity-imparting agent is moved from one side so as to coat the shaft with the solid rubber paste and to crosslink the rubber. The method disclosed in this prior art is directed to formation of a solid rubber single layer and is intended to prevent non-uniformity of the electrical resistivity over the entire rubber layer which may be derived from the heat history in the forming or vulcanizing step and from difference in pressure applied to the rubber layer.

BRIEF SUMMARY OF THE INVENTION

An object of the present invention is to provide a transfer belt for an electrophotographic apparatus, comprising a seamless reinforcing layer formed of a continues string and a semi-conductive rubber layer formed on the reinforcing layer, and exhibiting a dimensional stability over a long period of time, a stability in electrical resistivity under various environments, a high resistance to ozone and an excellent heat resistance.

Another object is to provide a transfer belt for an electrophotographic apparatus, comprising a semi-conductive rubber layer and a sponge-like compressible layer having a semi-conductivity, which is formed on the rubber layer, so as not to do damage to a photoconductive drum and to permit widening the nipping width.

Still another object of the present invention is to provide a method of manufacturing a transfer belt for an electrophotographic apparatus, the transfer belt exhibiting a dimensional stability over a long period of time, a stability in electrical resistivity under various environments, a high resistance to ozone and an excellent heat resistance, and the method comprising the steps of coating a mandrel with a semi-conductive rubber paste, continuously winding a string about the mandrel from one end of the mandrel while rotating the mandrel so as to form a seamless reinforcing layer, forming a semi-conductive rubber layer on the reinforcing layer, and withdrawing the structure consisting of the reinforcing layer and the semi-conductive rubber layer from the mandrel.

According to an aspect of the present invention, there is provided a transfer belt for an electro-photographic apparatus, comprising a seamless reinforcing layer formed of a continuous string, and a semi-conductive rubber layer formed on the reinforcing layer.

According to another aspect of the present invention, there is provided a method of manufacturing a transfer belt for an electrophotographic apparatus, comprising the step of coating a mandrel with a semi-conductive rubber paste, the step of continuously winding a string about the mandrel from one end of the mandrel while rotating the mandrel so as to form a seamless reinforcing layer, the step of forming a semi-conductive rubber layer on the reinforcing layer, and the step of withdrawing the structure consisting of the reinforcing layer and the semi-conductive rubber layer from the mandrel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Let us describe the present invention more in detail with reference to the accompanying drawings.

Figure 5A:
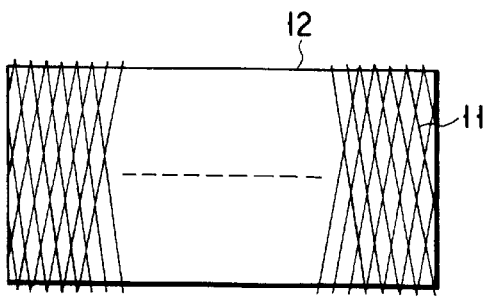
FIGS. 5A and 5B show reinforcing layers each included in the transfer belt of the present invention and formed of a continuous string.
Figure 5B:
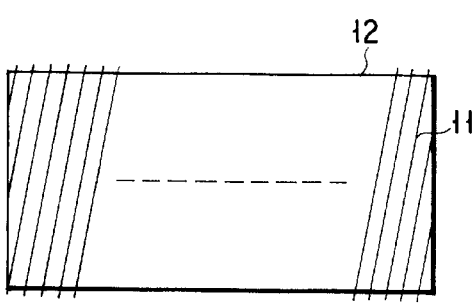

The transfer belt of the present invention comprises a seamless reinforcing layer. The seamless reinforcing layer is of a single layer structure, which is prepared by continuously winding a continuous string 11 about a mandrel 12 from one end portion of the mandrel 12, as shown in FIG. 5B. Alternatively, the seamless reinforcing layer is of a double layer structure, which is prepared by continuously winding continuous string 11 about the mandrel 12 from one end portion of the mandrel 12, as shown in FIG. 5A. The transfer belt comprising the reinforcing layer is substantially prevented from being transferred zigzag.

The string is wound about a mandrel by using an apparatus comprising a rotary shaft having the mandrel mounted thereto and a transfer mechanism for moving a truncated cone-shaped bobbin wound with a large number of turns of a string. In each of FIGS. 5A and 5B, a clearance is provided between adjacent turns of the string 11 to set forth clearly the construction of the reinforcing layer formed of the string. However, it is practically desirable to eliminate the clearance substantially completely. The reinforcing layer is intended to prevent the transfer belt from bearing an elongation set.

The distance between adjacent turns of the string constituting the reinforcing layer is determined by controlling the feeding rate of the string. To be more specific, the distance noted above can be decreased to increase the string density about the mandrel by decreasing the string feeding rate and can be increased by increasing the string feeding rate. It is desirable to control the string feeding rate to permit the adjacent turns of the string to contact lightly with each other. If a large clearance is provided between adjacent turns of the string, each turn of the string is made visible, which is not desirable.

For preparing the string constituting the reinforcing layer, it is possible to use various materials including natural fibers such as cotton, hemp, silk and rayon; synthetic fibers such as polyester, nylon, polyamide, polyimide and aramid; monofilament yarn or multifilament yarn of metallic inorganic fibers such as steel carbon and ceramic materials; two ply yarn and fibers spun from a mixture thereof. The thickness of the string, which is dependent on the thickness of the transfer belt, should desirably be 0.1 to 0.5 mm because the thickness of the transfer belt is generally about 0.5 to 1 mm.

In order to impart a semi-conductivity to the reinforcing layer formed of a string, the reinforcing layer is coated with a rubber paste or an adhesive having a semi-conductivity so as to permit the reinforcing layer to be impregnated with the particular paste or adhesive. Alternatively, the string used for forming the reinforcing layer is impregnated in advance with a rubber paste or adhesive having a semi-conductivity. Since a semi-conductivity is imparted to the reinforcing layer, a uniform conductivity can be guaranteed.

In order to prevent a permanent set of the transfer belt, it is conceivable to line the inner surface of the belt with a film, a woven fabric or an unwoven fabric, followed by forming a rubber layer on the lining. It should be noted, however, that it is unavoidable to join the end portions of the reinforcing layer consisting of the lining and the rubber layer with, for example, an adhesive or a string so as to make the reinforcing layer endless. As a result, the transfer belt is caused to include a stepped portion formed in the step of joining the end portions of the reinforcing layer, making it impossible to transfer toner images accurately on a paper sheet when the transfer belt is used in, for example, a copying machine. Also, the film used as a lining material tends to be split and is low in elasticity, with the result that the transfer belt lined with the film lacks a restoring force and, thus, tends to run zigzag.

As another method of preventing a permanent set, it is conceivable to employ a circular knitting method using a circular knitting material of an inlay knitting structure for forming a reinforcing layer, followed by forming a rubber layer on the upper surface of the reinforcing layer. This method is certainly effective in that use of the circular knitting material permits preparing a seamless reinforcing layer. However, it is difficult to form a rubber layer on the surface of the reinforcing layer and to control strictly the dimension of the transfer belt, particularly, the inner diameter of the belt. It is also necessary to prepare an apparatus for thickening or thinning the inner diameter of the belt, leading to a serious economic burden.

Figure 6:
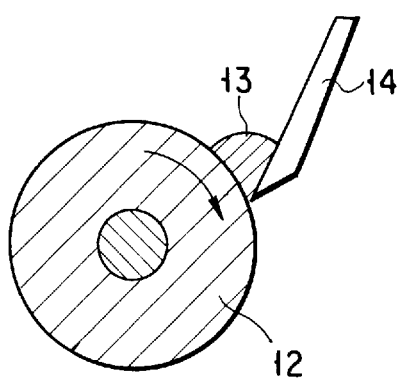
FIG. 6 shows a rotary coating method of a rubber paste, which is employed in the method of the present invention.

In the present invention, the reinforcing layer is coated with a semi-conductive rubber layer as shown in, for example, FIG. 6. In this method, a reinforcing layer (not shown) formed on the surface of the mandrel 12, which is kept rotated, is coated with a rubber paste 13 prepared by dissolving rubber in a solvent by using a doctor blade 14, followed by heating and vulcanizing the resultant rubber layer within a heating can or oven to coat the reinforcing layer with the rubber layer. In the case of using a sponge rubber, the rubber is foamed in the vulcanizing step.

Alternatively, it is possible to laminate a rubber sheet on a reinforcing layer formed on the mandrel. It is also possible to prepare a cylindrical hose by using an extruder, followed by covering the reinforcing layer formed on the mandrel with the resultant hose and subsequently heating and vulcanizing the hose. The semi-conductive rubber paste used in the present invention includes a rubber paste mixed with a semi-conductivity imparting agent, a rubber paste containing a large number of micro-balloons having a semi-conductivity, and a rubber paste containing a foaming agent exhibiting a semi-conductivity.

Figure 4A:
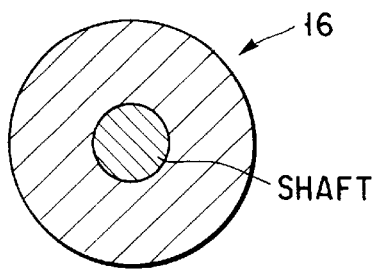
FIGS. 4A and 4B are cross sectional views each showing a mandrel used for manufacturing the transfer belt of the present invention.
Figure 4B:
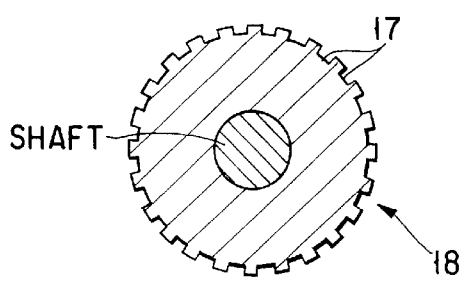
Figure 9:
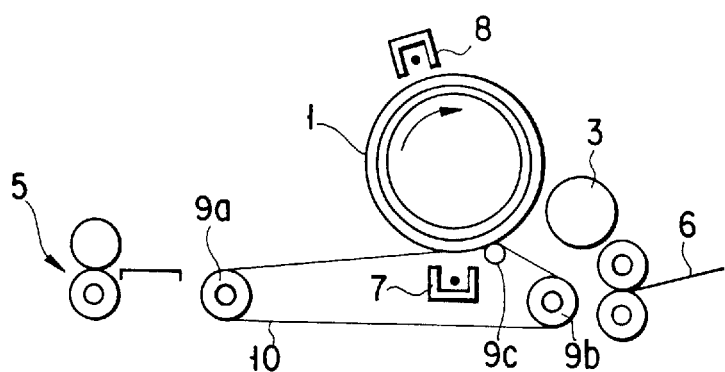
FIG. 9 shows the concept of a transfer belt system.

The mandrel used in the present invention includes a mandrel 16 having a smooth surface as shown in, for example, FIG. 4A and a mandrel 18 having a plurality of axial grooves 17 formed along the circumferential surface as shown in, for example, FIG. 4B. In the case of using the mandrel 18 shown in FIG. 4B, grooves are formed on the inner surface of the transfer belt because axial grooves 17 are formed on the circumferential surface of the mandrel 18. It follows that, if teeth are formed on the outer circumferential surface of one of the driving rolls 9a and 9b included in the transfer belt system shown in FIG. 9 so as to permit these teeth to be engaged with the grooves formed on the inner surface of the transfer belt, the transfer belt is prevented from running zigzag without fail.

The semi-conductive rubber layer used in the present invention includes a semi-conductive elastomer (solid rubber) layer and a semi-conductive sponge-like compressible layer. The material of the semi-conductive elastomer layer includes, for example, chloroprene rubber, epichlorohydrin rubber, ethylene-propylene rubber, silicone rubber, fluororubber, nitrile rubber, acrylic rubber, urethane rubber, styrene-butylene rubber and butyl rubber. On the other hand, the material of the compressible layer includes a large number of micro-balloons made of a thermoplastic resin. In this case, the wall of the micro-balloon is formed of a copolymer of vinylidene chloride, acrylonitrile, acrylic acid ester or a methacrylic acid ester. Alternatively, an organic or inorganic blowing agent can be added to the semiconductive elastomer. In this case, the semiconductive elastomer is heated to cause the foaming agent to generate a gas, thereby to prepare a foamed compressible layer. It is desirable to use a sponge-like compressible layer because no damage is done to the photoconductive drum and it is possible to secure a large nip width.

In the present invention, it is desirable to form an electrical resistance control layer on the semi-conductive rubber layer, as required. The electrical resistance control layer can be formed by coating the semi-conductive rubber layer with a solution prepared by dissolving, for example, N-methoxymethylated nylon in a mixed solvent consisting of toluene and methanol. The electrical resistance control layer thus formed has a smooth surface and, at the same time, prevents the photoconductive drum from being contaminated so as to stabilize the electrical resistance.

Figure 1:
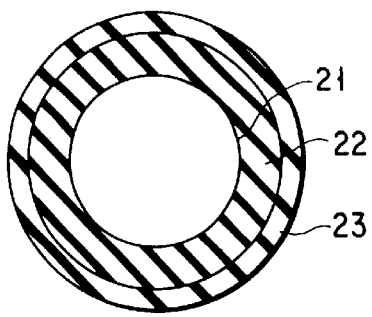
FIG. 1 is a cross sectional view showing a transfer belt for an electrophotographic apparatus according to one embodiment of the present invention.
Figure 2:
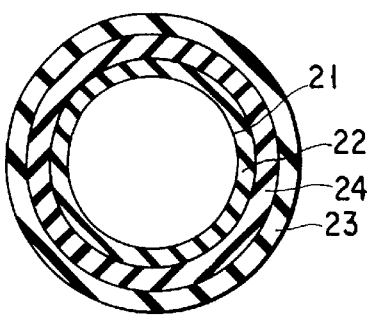
FIG. 2 is a cross sectional view showing a transfer belt for an electrophotographic apparatus according to another embodiment of the present invention.
Figure 3:
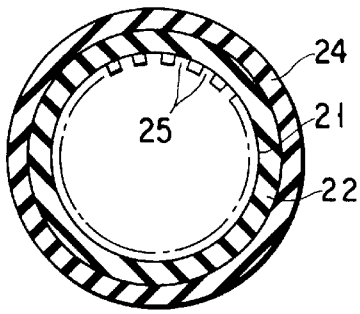
FIG. 3 is a cross sectional view showing a transfer belt for an electrophotographic apparatus according to still another embodiment of the present invention.

FIGS. 1, 2 and 3 are cross sectional views each showing a transfer belt for an electrophotographic apparatus. The transfer belt shown in FIG. 1 comprises a seamless reinforcing layer 21 formed of a continuous single string, a semi-conductive rubber layer 22 formed on the reinforcing layer 21, and an electrical resistance control layer 23 formed on the semi-conductive rubber layer 22. In the transfer belt shown in FIG. 2, a semi-conductive sponge layer 24 is interposed between the semi-conductive rubber layer 22 and the resistance control layer 23 shown in FIG. 1. Further, the transfer belt shown in FIG. 3 comprises a reinforcing layer 21 having a large number of axial grooves 25 formed on the inner circumferential surface, a semi-conductive rubber layer 22 formed on the reinforcing layer 21, and a semi-conductive sponge layer 24 formed on the semi-conductive rubber layer 22.

The present invention is also directed to a method of manufacturing a transfer belt for an electro-photographic apparatus. The method of the present invention includes types (1) to (5) given below depending on the type of the semi-conductive rubber layer included in the transfer belt:

(1) A method of manufacturing a transfer belt for an electrophotographic apparatus, comprising the step of coating a mandrel with a semi-conductive rubber paste, the step of forming a seamless reinforcing layer by continuously winding a string about the mandrel from one end of the mandrel while rotating the mandrel, the step of coating the reinforcing layer with a rubber paste having a semi-conductivity while rotating the mandrel, followed by vulcanizing and surface-polishing the rubber layer so as to form a semi-conductive rubber layer, the step of forming an electrical resistance control layer on the semi-conductive rubber layer; and the step of withdrawing the structure consisting of the reinforcing layer, the semi-conductive rubber layer and the resistance control layer from the mandrel.

(2) A method of manufacturing a transfer belt for an electrophotographic apparatus, comprising the step of coating a mandrel with a semi-conductive rubber paste, the step of forming a seamless reinforcing layer by continuously winding a string about the mandrel from one end of the mandrel while rotating the mandrel, the step of coating the reinforcing layer with a rubber paste having a semi-conductivity and containing a large number of microballoons while rotating the mandrel, followed by vulcanizing and surface-polishing the rubber layer so as to form a semi-conductive rubber layer, the step of forming an electrical resistance control layer on the semi-conductive rubber layer; and the step of withdrawing the structure consisting of the reinforcing layer, the semi-conductive rubber layer and the resistance control layer from the mandrel.

(3) A method of manufacturing a transfer belt for an electrophotographic apparatus, comprising the step of coating a mandrel with a semi-conductive rubber paste, the step of forming a seamless reinforcing layer by continuously winding a string about the mandrel from one end of the mandrel while rotating the mandrel, the step of coating the reinforcing layer with a rubber paste having a semi-conductivity and containing a foaming agent while rotating the mandrel, followed by vulcanizing and foaming the rubber layer so as to form a semi-conductive rubber layer, the step of forming an electrical resistance control layer on the semi-conductive rubber layer; and the step of withdrawing the structure consisting of the reinforcing layer, the semi-conductive rubber layer and the resistance control layer from the mandrel.

(4) A method of manufacturing a transfer belt for an electrophotographic apparatus, comprising the step of coating a mandrel with a semi-conductive rubber paste, the step of forming a seamless reinforcing layer by continuously winding a string about the mandrel from one end of the mandrel while rotating the mandrel, the step of forming an non-vulcanized rubber sheet having a semi-conductivity on the reinforcing layer, followed by vulcanizing and surface-polishing the rubber layer so as to form a semi-conductive rubber layer, the step of forming an electrical resistance control layer on the semi-conductive rubber layer; and the step of withdrawing the structure consisting of the reinforcing layer, the semi-conductive rubber layer and the resistance control layer from the mandrel.

(5) A method of manufacturing a transfer belt for an electrophotographic apparatus, comprising the step of coating a mandrel with a semi-conductive rubber paste, the step of forming a seamless reinforcing layer by continuously winding a string about the mandrel from one end of the mandrel while rotating the mandrel, the step of extruding a non-vulcanized rubber sleeve having a semi-conductivity onto the reinforcing layer, followed by vulcanizing and surface-polishing the rubber sleeve so as to form a semi-conductive rubber sleeve layer, the step of forming a resistance control layer on the semi-conductive rubber sleeve layer; and the step of withdrawing the structure consisting of the reinforcing layer, the semi-conductive rubber sleeve layer and the resistance control layer from the mandrel.

In the method of the present invention, the mandrel is coated first with a semi-conductive rubber paste. However, it is also possible to use a mandrel coated in advance with a semi-conductive rubber paste. In other words, it is possible to wind a string about a mandrel coated in advance with a semi-conductive rubber paste so as to prepare a seamless reinforcing layer. It is also possible to use a mandrel provided with a large number of axial grooves arranged in the circumferential direction. In this case, it is possible to rotate the mandrel with the axial grooves coated with a semi-conductive rubber paste.

The transfer belt of the present invention comprises a reinforcing layer formed of a single continuous string and serving to prevent elongation of the transfer belt. Therefore, the permanent set of the transfer belt is extremely small if the transfer belt is used under a tension falling within a breaking extension. On the other hand, the conventional transfer belt is formed of rubber alone and, thus, does not include a reinforcing layer. It follows that, if the conventional transfer belt is allowed to stand under a certain tension over a long period of time, the belt is caused to bear an elongation set. Further, the transfer belt of the present invention also comprises a rubber layer, with the result that the transfer belt is prevented from running zigzag by the elastic restoring force of the transfer belt.

Let us describe some Examples of the present invention.

EXAMPLE 1

Figure 7:
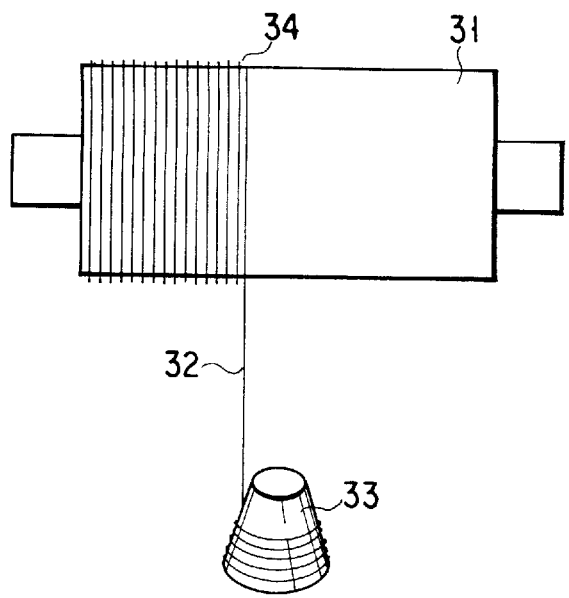
FIG. 7 shows how to prepare a reinforcing layer in the method of the present invention.
Figure 8:
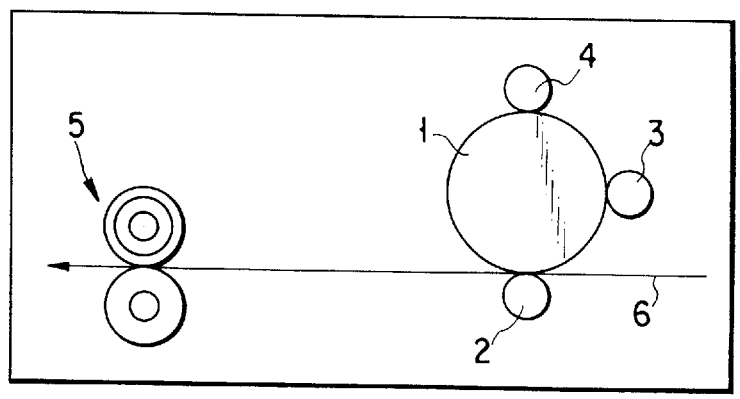
FIG. 8 shows the concept of a copying machine.

Let us describe this Example with reference to FIG. 7 and Table 1. Specifically, Table 1 shows the composition of a semi-conductive rubber containing a conductivity-imparting agent including a conductive carbon black (Ketchen black EC), conductive zinc white, and a potassium titanate whisker.

In the first step, a rubber paste was prepared by sufficiently mixing the rubber composition shown in Table 1 with milling rolls, followed by dissolving the resultant mixture in toluene. Then, the surface of a mandrel 31 shown in FIG. 7, which had a diameter of 150 mm and a width of 300 mm, was polished and plated with chromium, followed by mounting the mandrel 31 to a rotatable shaft. Under this condition, the surface of the mandrel 31 was uniformly coated with a silicone oil acting as a release agent. Further, the rubber paste noted above was sprayed with a spray gun against the surface of the mandrel 31 while rotating the mandrel 31 to form a uniform rubber paste layer having a thickness of 0.1 mm after drying.

In the next step, a bobbin 33 wound with a cotton string 32 having a thickness of 0.3 mm was rotatably mounted to a moving apparatus arranged in front of a carriage, and one end of the string 32 was fixed to one end of the mandrel 31. Under this condition, the mandrel 31 was rotated and, at the same time, the moving apparatus having the bobbin 33 mounted thereon was driven so as to wind the string 32 continuously about the mandrel 31 and, thus, to form a reinforcing layer 34. Then, the rubber paste prepared in advance was sprayed against the mandrel 31 with a spray gun to permit the rubber paste to permeate sufficiently into the reinforcing layer 34. Further, a solid semi-conductive rubber layer of the composition shown in Table 1, which was prepared separately, was laminated on the reinforcing layer, followed by putting the resultant structure in a vulcanizer having the temperature controlled at 150° C. for vulcanizing the solid rubber layer. The vulcanization was completed in 3 hours.

After the vulcanizing treatment, the solid rubber layer was cooled. Then, the surface of the rubber layer was polished with a polishing machine so as to reduce the outer diameter of the rubber layer to 152 mm, followed by applying a sand paper of 400 meshes to the surface of the rubber layer so as to set the surface roughness Rz at 2 μm. Then, the surface of the rubber layer was coated by a spray gun with a solution prepared by dissolving N-methoxy methylated nylon-6 in a mixed solvent consisting of toluene and methanol. The solution layer was dried to form a resistance control layer. Finally, the structure consisting of the reinforcing layer, the rubber layer and the resistance control layer was withdrawn from the mandrel 31 so as to manufacture a transfer belt having a semi-conductivity for an electrophotographic apparatus, said transfer belt having an inner diameter of 150 mm and including a seamless reinforcing layer 34 formed of the continuous cotton string 32. The transfer belt thus manufactured was found to have a Shore A hardness of 55°.

TABLE 1

| Composition | Parts by weight |
| --- | --- |
| Ethylene-propylene rubber (trade name of Mitsui EPT 4025 manufactured by Mitsui Chemical Co., Ltd.) | 100 |
| Zinc oxide | 5 |
| Powdery sulfur | 1.5 |
| Vulcanization promoter (trade name of Nocceller TS manufactured by Ouchi Shinko Kagaku Co., Ltd.) | 1 |
| Vulcanization promoter (trade name of Nocceller DM manufactured by Ouchi Shinko Kagaku Co., Ltd.) | 1 |
| Stearic acid | 1 |
| Carbon black (trade name of Ketchen black EC manufactured by Mitsubishi Chemical Co., Ltd.) | 10 |
| Electrically conductive zinc oxide | 20 |
| Potassium titanate whisker (trade name of Dentol WK · 200B manufactured by Otsuka Kagaku Co, Ltd.) | 20 |
| Calcium carbonate | 30 |
| Softening agent (trade name of Process Oil NS · 24 manufactured by Nippon Oil Co., Ltd.) | 30 |
| Sum | 219.5 |

The transfer belt for an electrophotographic apparatus thus manufactured comprises a seamless reinforcing layer formed of a continuous string, a semi-conductive rubber layer formed on the reinforcing layer, and a resistance control layer formed on the semi-conductive rubber layer. The transfer belt was cut in a width of 1 cm. One end of the cut piece of the belt was fixed, with a weight of 3 Kgf hung from the other end. Elongation of the cut piece of the belt was found to be 2.1% when measured 24 hours later and to be 2.5% when measured 500 hours later. Further, a voltage of 2 KV was applied across the cut piece of the belt under various environments so as to measure the electrical resistance of the cut piece. The electrical resistance was found to be $1.1 \times 10^{10}$ Ω under room temperature and a low humidity (23° C., RH 5%), $5.5 \times 10^9$ Ω under room temperature and an ordinary humidity (23° C., RH 55%), and $3 \times 10^9$ Ω under room temperature and a high humidity (23° C., RH 80%). In conclusion, the transfer belt of the present invention was found to be excellent in dimensional stability and stability of electrical resistance.

EXAMPLE 2

The surface of a mandrel having a diameter of 150 mm and a width of 300 mm was polished and plated with chromium. Then, the mandrel was mounted to a carriage, followed by uniformly coating the surface of the mandrel with a release agent of a silicone oil. On the other hand, a rubber paste was prepared by sufficiently mixing the semi-conductive rubber composition shown in Table 1 with milling rolls, followed by dissolving the resultant mixture in toluene. The solution was uniformly sprayed with a spray gun against the surface of the mandrel to form a rubber paste layer having a thickness of 0.1 mm after drying.

In the next step, a bobbin wound with a polyester string having a thickness of 0.15 mm was rotatably mounted to a moving apparatus arranged in front of the carriage. One end of the polyester string was fixed to one end of the mandrel. Under this condition, a moving apparatus having the bobbin mounted thereon was driven while rotating the mandrel so as to continuously wind the polyester string about the bobbin. When the string wound about the bobbin reached the other end of the mandrel, a clutch of the moving apparatus was switched so as to wind the string about the mandrel from the other end toward said one end so as to form a reinforcing layer made of the polyester string, said reinforcing layer being of a double layer structure.

Further, a rubber composition shown in Table 2 was sufficiently mixed with milling rolls, followed by dissolving the resultant mixture in toluene so as to prepare a rubber paste. As shown in Table 2, the rubber composition contained micro-balloons (Expancel 091DE) having a diameter of 40 to 60 μm. Upon vulcanization, the rubber composition is converted into a semi-conductive sponge rubber.

Then, the reinforcing layer was coated with the rubber paste noted above to form a rubber paste layer having a thickness of 1 mm. In this coating step, a doctor blade 14 was mounted to the mandrel 12 and the rubber paste 13 was supplied to the doctor blade 14, as shown in FIG. 6. Under this condition, the mandrel 12 was rotated so as to achieve the desired coating. After toluene was sufficiently evaporated from the rubber paste, the rubber composition was vulcanized for 5 hours within an oven having the temperature controlled at 150° C. As a result, the formed sponge rubber layer was somewhat shrunk to have an outer diameter of 152.5 mm.

In the next step, the surface of the sponge rubber layer was polished on a polishing disc to reduce the outer diameter to 152.0 mm. Then, the sponge rubber layer was coated with GLP-102NR, which is the trade name of a primer manufactured by Daikin Co. Ltd., to form a primer layer, followed by spraying GL-213D, which is the trade name of a fluororubber paint manufactured by Daikin Co. Ltd., with a spray gun against the primer layer so as to form a fluororubber layer having a thickness of 50 μm as a resistance control layer on the primer layer. The fluororubber layer (resistance control layer) was subjected to a heat treatment at 150° C. for 30 minutes. Finally, the structure consisting of the reinforcing layer of the double layer structure, the semi-conductive rubber layer, the semi-conductive sponge layer and the resistance control layer was withdrawn from the mandrel 12 so as to manufacture a transfer belt having an inner diameter of 150 mm, a thickness of 1 mm and a width of 300 mm. The transfer belt thus manufactured was found to have a JIS E hardness of 40°.

TABLE 2

| Composition | Parts by weight |
| --- | --- |
| Ethylene-propylene rubber (trade name of Mitsui EPT 4025 manufactured by Mitsui Chemical Co., Ltd.) | 50 |
| Ethylene-propylene rubber (trade name of Mitsui EPT 4045 | 50 |

TABLE 2-continued

| Composition | Parts by weight |
|---|---|
| manufactured by Mitsui Chemical Co., Ltd.) | |
| Powdery sulfur | 1.5 |
| Vulcanization promoter (trade name of Nocceller DM manufactured by Ouchi Shinko Kagaku Co., Ltd.) | 1 |
| Vulcanization promoter (trade name of Nocceller TS manufactured by Ouchi Shinko Kagaku Co., Ltd.) | 1 |
| Zinc oxide | 5 |
| Stearic acid | 1 |
| Carbon black (trade name of Ketchen black EC manufactured by Mitsubishi Chemical Co., Ltd.) | 10 |
| Electrically conductive zinc oxide | 20 |
| Potassium titanate whisker (trade name of Dentol WK · 200B manufactured by Otsuka Kagaku Co., Ltd.) | 20 |
| Calcium carbonate | 30 |
| Softening agent (trade name of Process Oil NS · 24 manufactured by Nippon Oil Co., Ltd.) | 30 |
| Micro-balloon (trade name: Expancel 091DE manufactured by Novel Industry, Inc.) | 10 |
| Sum | 229.5 |

The transfer belt for an electrophotographic apparatus thus manufactured comprises a continuous seamless reinforcing layer of a double layer structure made of a polyester string, a semi-conductive rubber layer formed on the reinforcing layer, a semi-conductive sponge layer formed on the semi-conductive rubber layer, and a resistance control layer formed on the semi-conductive sponge layer.

The transfer belt was cut in a width of 1 cm. One end of the cut piece of the belt was fixed, with a weight of 3 Kgf hung from the other end. Elongation of the cut piece of the belt was found to be 3.1% when measured 24 hours later and to be 3.4% when measured 500 hours later. Further, a voltage of 2 KV was applied across the cut piece of the belt under various environments so as to measure the electrical resistance of the cut piece. The resistance was found to be $1.2 \times 10^{10}$ Ω under room temperature and a low humidity (23° C., RH 5%), $6 \times 10^9$ Ω under room temperature and an ordinary humidity (23° C., RH 55%), and $5.1 \times 10^9$ Ω under room temperature and a high humidity (23° C., RH 80%).

EXAMPLE 3

Prepared was a mandrel having a diameter of 150 mm and a width of 600 mm. The mandrel was provided with a large number of axial grooves each having a width of 1 mm and a depth of 1 mm. These axial grooves were arranged equidistantly in the circumferential surface of the mandrel. The mandrel was uniformly coated with a release agent of a silicone oil. On the other hand, a rubber paste was prepared by sufficiently mixing the semi-conductive rubber composition shown in Table 3 with milling rolls, followed by dissolving the resultant mixture in toluene. Then, the rubber paste was sprayed with a spray gun against the mandrel while rotating the mandrel on a carriage so as to fill the axial grooves of the mandrel with the rubber paste.

On the other hand, a bobbin wound with Cornex string (trade name of aramid fiber string manufactured by Teijin Ltd.) having a thickness of 0.15 mm and subjected in advance to an adhesive treatment was rotatably mounted to a moving apparatus arranged in front of the carriage. One end of the aramid fiber string was fixed to one end of the mandrel. Under this condition, the moving apparatus having the bobbin mounted thereon was driven while rotating the mandrel so as to wind continuously the aramid fiber string about the mandrel and, thus, to form a reinforcing layer.

In the next step, a rubber paste of the composition shown in Table 3 was sprayed with a spray gun against the reinforcing layer to permit the rubber paste to permeate into the string forming the reinforcing layer. Then, a rubber sheet having a thickness of 0.3 mm was prepared by sufficiently mixing a rubber composition shown in Table 4 with milling rolls, followed by sheeting the mixture with a calender machine. The composition shown in Table 4 contains a foaming agent and, thus, generates mainly a nitrogen gas when heated so as to be converted into a semi-conductive sponge rubber. The rubber sheet thus prepared was wound twice about the mandrel, followed by tightening the wound rubber sheet with a polyethylene sheet.

Further, the mandrel was put in an oven having the temperature controlled at 150° C. so as to vulcanize the rubber sheet for 5 hours. During the vulcanizing step, the foaming agent contained in the rubber composition was decomposed so as to generate a gas, with the result that the rubber sheet was converted into a semi-conductive sponge layer. When cooled, the surface of the sponge layer was polished with a polishing machine so as to reduce the outer diameter of the sponge layer to 152 mm. The surface layer was found to consist of a semi-conductive sponge rubber containing cells each having a diameter of 100 to 150 μm. Finally, the structure consisting of the reinforcing layer, the rubber sheet, and the semi-conductive sponge rubber layer was withdrawn from the mandrel so as to obtain a transfer belt for an electrophotographic apparatus having an inner diameter of 150 mm, a thickness of 1 mm, and a large number of axial grooves formed on the inner circumferential surface, each of said axial grooves having a depth of 1 mm and a width of 1 mm. The transfer belt thus obtained was found to have a JIS E hardness of 35°.

TABLE 3

| Composition | Parts by weight |
|---|---|
| Epichlorohydrin rubber (trade name: Epichlomer CG-102, manufactured by Daiso Inc.) | 100 |
| Powdery sulfur | 1 |
| Magnesium oxide | 5 |
| Vulcanization promoter (trade name of Nocceller 22 manufactured by Ouchi Shinko Kagaku Co., Ltd.) | 1.5 |
| Vulcanization promoter (trade name of Nocceller TRA manufactured by Ouchi Shinko Kagaku Co., Ltd.) | 1 |
| Lubricant (trade name of DR1000 manufactured by Daiso Inc.) | 0.5 |
| LiCF$_3$SO$_3$ (ionic conductive agent) | 0.5 |
| Electrically conductive zinc oxide (trade name of 23-K manufactured by Hakusui Kagaku Inc.) | 10 |
| Carbon black (trade name of Ketchen black EC manufactured by Mitsubishi Chemical Co., Ltd.) | 10 |
| Potassium titanate whisker (trade name of H. A. FOB manufactured by Otsuka Kagaku Co., Ltd.) | 10 |
| Titanium oxide (trade name of FT-2000 manufactured by Ishihara Sangyo Kaisha Ltd.) | 10 |
| Calcium carbonate | 20 |

TABLE 4

| Composition | Parts by weight |
|---|---|
| Epichlorohydrin rubber (trade name: Epichlomer CG-102, manufactured by Daiso Inc.) | 70 |
| Nitrile rubber (trade name of Nipole DN201 manufactured by Nippon Zeon Inc.) | 30 |
| Powdery sulfur | 1 |
| Zinc oxide | 5 |
| Vulcanization promoter (trade name of Nocceller 22 | 1 |

TABLE 4-continued

| Composition | Parts by weight |
|---|---|
| manufactured by Ouchi Shinko Kagaku Co., Ltd.) | |
| Vulcanization promoter (trade name of Nocceller TRA manufactured by Ouchi Shinko Kagaku Co., Ltd.) | 1 |
| Aging inhibitor (trade name of Nocrac NBC manufactured by Ouchi Shinko Kagaku Co., Ltd.) | 1 |
| LiCF$_3$SO$_3$ (ionic conductive agent) | 0.5 |
| Electrically conductive zinc white (trade name of 23-K manufactured by Hakusui Kagaku Inc.) | 10 |
| HAF carbon black | 10 |
| Titanium oxide (trade name of FT-2000 manufactured by Ishihara Sangyo Kaisha Ltd.) | 10 |
| Calcium carbonate | 20 |
| Foaming agent (trade name: neocellbon N#5000 manufactured by Eiwa Kasei Co., Ltd.) | 8 |

The transfer belt for an electrophotographic apparatus thus prepared comprises a seamless reinforcing layer of a single layer structure made of a continuous aramid fiber string, a rubber sheet formed on the reinforcing layer, and a semi-conductive sponge rubber layer formed on the rubber sheet.

The transfer belt was cut in a width of 1 cm. One end of the cut piece of the belt was fixed, with a weight of 3 Kgf hung from the other end. Elongation of the cut piece of the belt was found to be 1.2% when measured 24 hours later and to be 1.8% when measured 500 hours later. Further, a voltage of 2 KV was applied across the cut piece of the belt under various environments so as to measure the electrical resistance of the cut piece. The resistance was found to be $1.1 \times 10^8$ Ω under room temperature and a low humidity (23° C., RH 5%), $9.5 \times 10^7$ Ω under room temperature and an ordinary humidity (23° C., RH 55%), and $5 \times 10^7$ Ω under room temperature and a high humidity (23° C., RH 80%).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transfer belt for an electrophotographic apparatus comprising a seamless reinforcing layer formed of a continuous string and a semi-conductive rubber layer formed on the reinforcing layer wherein the reinforcing layer is of a single layer structure prepared by winding a single string without using a weft about a mandrel from one end toward the other end of the mandrel such that a clearance is not provided between adjunct turns of the string would about the mandrel.

2. The transfer belt for an electrophotographic apparatus according to claim 1, wherein a semi-conductive sponge-like compressible layer is formed on said semi-conductive rubber layer.

3. The transfer belt for an electrophotographic apparatus according to claim 1, wherein a resistance control layer is formed on the semi-conductive rubber layer.

4. The transfer belt for an electrophotographic apparatus according to claim 1, wherein the reinforcing layer is of a double layer structure prepared by winding a single string without using a weft about a mandrel from one end toward the other end of the mandrel such that a clearance is not provided between adjacent turns of the string wound about the mandrel, followed by winding a single string without using a weft about the mandrel from said other end toward said one end of the mandrel such that a clearance is not provided between adjacent turns of the string wound about the mandrel.

5. The transfer belt for an electrophotographic apparatus according to claim 1, wherein the material of the string constituting the reinforced layer is monofilament yarn, multifilament yarn, and ply yarn selected from the group consisting of natural fibers; synthetic fibers; metallic or inorganic fibers; and fibers spun from a mixture thereof.

6. The transfer belt for an electrophotographic apparatus according to claim 1, wherein the string has a diameter of 0.1 to 0.5 mm.

7. The transfer belt for an electrophotographic apparatus according to claim 1, wherein the semi-conductive rubber layer consists of an elastomer selected from the group consisting of chloroprene rubber, epichlorohydrin rubber, ethylene-propylene rubber, silicone rubber, fluororubber, nitrile rubber, acrylic rubber, urethane rubber, styrene-butadiene rubber, butyl rubber and a mixture thereof.

8. The transfer belt for an electrophotographic apparatus according to claim 1, wherein the semi-conductive rubber layer consists of a semi-conductive sponge-like compressible layer containing a large number of micro-balloons, the wall material of the micro-balloon being made of a thermoplastic material selected from the group consisting of copolymers of vinylidene chloride, acrylonitrile, acrylic acid ester and methacrylic acid ester, or said compressible layer being obtained by heating an organic or inorganic foaming agent to generate a gas.

9. The transfer belt for an electrophotographic apparatus according to claim 1, wherein the string constructing said reinforcing layer is coated with a rubber paste.

10. The transfer belt for an electrophotographic apparatus comprising a seamless reinforcing layer formed of a continuous string and a semi-conductive rubber layer formed on the reinforcing layer wherein the reinforcing layer is a double layer structure prepared by winding a single string without using a weft about a mandrel from one end toward the other end of the mandrel such that a clearance is not provided between adjacent turns of string wound about the mandrel, followed by winding a single string without using a weft about the mandrel from said other end toward said one end of the mandrel such that a clearance is not provided between adjacent turns of the string wound about the mandrel.

11. The transfer belt for an electrophotographic apparatus according to claim 10, wherein a semi-conductive sponge-like compressible layer is formed on said semi-conductive rubber layer.

12. The transfer belt for an electrophotographic apparatus according to claim 10, wherein a resistance control layer is formed on the semi-conductive rubber layer.

13. The transfer belt for an electrophotographic apparatus according to claim 10, wherein the material of the string constituting the reinforced layer is monofilament yarn, multifilament yarn, and ply yarn selected from the group consisting of natural fibers; synthetic fibers; metallic or inorganic fibers; and fibers spun from a mixture thereof.

14. The transfer belt for an electrophotographic apparatus according to claim 10, wherein the string has a diameter of 0.1 to 0.5 mm.

15. The transfer belt for an electrophotographic apparatus according to claim 10, wherein the semi-conductive rubber layer consists of an elastomer selected from the group consisting of chloroprene rubber, epichlorohydrin rubber, ethylene-propylene rubber, silicone rubber, flourorubber, nitrile rubber, acrylic rubber, urethane rubber, styrene-butadiene rubber, butyl rubber and a mixture thereof.

16. The transfer belt for an electrophotographic apparatus according to claim 10, wherein the semi-conductive rubber layer consists of a semi-conductive sponge-like compressible layer containing a large number of micro-balloons, the wall material being made of a thermoplastic material selected from the group consisting of copolymers of vinylidene chloride, acryonitrile, acrylic acid ester and methacrylic acid ester, or said compressible layer being obtained by heating an organic or inorganic foaming agent to generate a gas.

17. The transfer belt for an electrophotographic apparatus according to claim 10, wherein the string constructing said reinforcing layer is coated with a rubber paste.

18. The transfer belt for an electrophotographic apparatus comprising a seamless reinforcing layer formed of a continuous string and a semi-conductive rubber layer formed on the reinforcing layer wherein the semi-conductive rubber layer consists of a semi-conductive sponge-like compressible layer containing a large number of micro-balloons, the wall material being made of a thermoplastic material selected from the group consisting of copolymers of vinylidene chloride, acryonitrile, acrylic acid ester and methacrylic acid ester, or said compressible layer being obtained by heating an organic or inorganic foaming agent to generate a gas.

19. The transfer belt for an electrophotographic apparatus according to claim 18, wherein the material of the string constituting the reinforced layer is monofilament yarn, multifilament yarn, and ply yarn selected from the group consisting of natural fibers; synthetic fibers; metallic or inorganic fibers; and fibers spun from a mixture thereof.

20. The transfer belt for an electrophotographic apparatus according to claim 18, wherein the string has a diameter of 0.1 to 0.5 mm.

21. The transfer belt for an electrophotographic apparatus according to claim 5, wherein said natural fibers are cotton, hemp, silk or rayon; said synthetic fibers are polyester, nylon, polyamide, polyimide or aramid; said metallic or inorganic fibers are steel, carbon or ceramic.

22. The transfer belt for an electrophotographic apparatus according to claim 13, wherein said natural fibers are cotton, hemp, silk or rayon; said synthetic fibers are polyester, nylon, polyamide, polyimide or aramid; said metallic or inorganic fibers are steel, carbon or ceramic.

23. The transfer belt for an electrophotographic apparatus according to claim 19, wherein said natural fibers are cotton, hemp, silk or rayon; said synthetic fibers are polyester, nylon, polyamide, polyimide or aramid; said metallic or inorganic fibers are steel, carbon or ceramic.

* * * * *

UNITED STATES PATENT AND TRADEMARK OFFICE
CERTIFICATE OF CORRECTION

PATENT NO.     : 6,303,215 B1
DATED          : October 16, 2001
INVENTOR(S)    : Sonobe et al.

Page 1 of 1

It is certified that error appears in the above-identified patent and that said Letters Patent is hereby corrected as shown below:

Claim 1,
Line 8, delete "would" and insert therefor -- wound --.

Signed and Sealed this

Ninth Day of April, 2002

Attest:

JAMES E. ROGAN
Attesting Officer
Director of the United States Patent and Trademark Office